(12) United States Patent
Neitfeld

(10) Patent No.: US 8,853,962 B2
(45) Date of Patent: Oct. 7, 2014

(54) APPARATUS AND METHOD FOR CIRCUIT CONFIGURATION FOR POWERING LIGHT EMITTING DIODES

(75) Inventor: Dieter Neitfeld, Paderborn (DE)

(73) Assignee: Hella KGAA, Lippstadt (DE)

(*) Notice: Subject to any disclaimer, the term of this patent is extended or adjusted under 35 U.S.C. 154(b) by 490 days.

(21) Appl. No.: 13/288,145

(22) Filed: Nov. 3, 2011

(65) Prior Publication Data
US 2012/0119671 A1  May 17, 2012

(30) Foreign Application Priority Data
Nov. 16, 2010  (DE) .................. 10 2010 060 585

(51) Int. Cl.
*H05B 33/08*  (2006.01)
*H02M 1/00*  (2006.01)

(52) U.S. Cl.
CPC .......... *H05B 33/0815* (2013.01); *Y02B 20/346* (2013.01); *H02M 2001/0009* (2013.01)
USPC ............................ 315/291; 315/224; 315/307

(58) Field of Classification Search
USPC .................... 315/307, 308, 291, 224
See application file for complete search history.

(56) References Cited

U.S. PATENT DOCUMENTS 7,030,572 B2 * 4/2006 Nijhof et al. ............... 315/291
2012/0038292 A1 * 2/2012 Kuo et al. ................... 315/297

* cited by examiner

*Primary Examiner* — David H Vu
(74) *Attorney, Agent, or Firm* — Husch Blackwell LLP

(57) ABSTRACT

A circuit configuration for powering electrical loads, especially light emitting diodes, using a DC voltage converter with controllable switching element.

11 Claims, 2 Drawing Sheets

APPARATUS AND METHOD FOR CIRCUIT CONFIGURATION FOR POWERING LIGHT EMITTING DIODES

RELATED APPLICATIONS

This application claims priority and benefit of German Patent Application No. 102010060585.9, filed on Nov. 16, 2010, all of which is incorporated herein by reference.

BACKGROUND OF INVENTION

1. Field of the Invention

The invention relates to a circuit configuration for powering loads, especially light emitting diodes, by a DC voltage converter with a controllable switching element.

2. Related Art

The invention relates to a circuit configuration for powering loads, especially light emitting diodes, by a DC voltage converter with a controllable switching element, which shall be controllable for setting the load current by a pulse-width modulated actuation signal, with a control circuit consisting of a controller for generating the pulse-width modulated actuation signal, with a circuit for setting the control circuit and a means for load current detection. The adjustment circuit shall hereby have at least one device for storing electrical energy such as a capacitor. The control circuit shall have an input for the controlled variable which is connected to the adjustment circuit and the means for load current detection. The circuit configuration has an input for switching an energy transfer on and off by a DC voltage converter.

The invention also relates to a method for powering loads, especially light emitting diodes, by a circuit configuration, especially with the aforementioned circuit configuration, whereas electrical energy shall be transferred by a DC voltage converter for powering the electrical energy. The load current shall be adjusted by a controller using a pulse-width modulated control signal and should be as constant as possible. The pulse-width-modulated signal is periodic and shall have pulses with a first pulse duration. These pulses shall be present during first pulse periods of the pulse-width modulated signal. The pulse periods shall have a first pulse period duration. The ratio of the first pulse duration to the first pulse period duration is called first duty cycle. By changing the first duty cycle, the load current can be adjusted.

The load current must be as constant as possible, since a change in load current at a preferred use of the circuit configuration and the method for powering LEDs shall change the color of the light emitted by the LEDs.

The brightness of the light emitted by the LEDs depends on the average power transferred to the LEDs. This is adjusted by turning an energy transfer through the DC-DC voltage converter to the LEDs on and off. The turning on and off shall take place periodically. The energy transfer may be turned on and off by means of a periodical signal. The energy transfer shall hereby be turned on by pulses of a second pulse duration. The periods of the periodical signal for turning the energy transfer on and off shall have a second pulse period duration. This results in a second duty cycle that can be used for adjusting the brightness of the LEDs.

Both the second pulse duration as well as the second pulse period duration are significantly larger than the first pulse duration or the first pulse period duration, respectively.

A circuit configuration of the aforementioned type is known from the publication "4.5-V to 52-V Input Current Mode Boost Controller" for the integrated circuits TPS40210 and TPS40211 by Texas Instruments Inc. This datasheet describes an example circuit (Design Example 2, see loc cit, page 34 ff, especially FIG. 36) in which the circuit for adjusting the controller circuit is called compensation network. Capacitors are provided as storage devices for electrical energy. The capacitors are connected to the input for the controlled variable of the controller circuit, which is also connected by interposition of resistors as a means of load current detection—to the cathode side of an LED array. The cathode side of the LED array is connected via at least one resistor with the reference potential of the circuit configuration.

SUMMARY OF THE INVENTION

As stated earlier, timed pulses with during pulse duration for the most part constant output voltage and for the most part constant output current shall transport the electrical energy converted by the DC voltage converter. By changing the ratio of the second pulse duration to the second pulse period duration, that is, the second duty cycle, the average power shall be adjusted in such cases. The energy transfer of such a circuit configuration shall thus be turned on upon start of each pulse and turned off with the end of the pulse. During a pulse, the controller of the controller circuit shall control the (as constant as possible) current by means of the PWM control of the switching element of the DC-DC voltage converters.

Turning the energy transfer on or off may be accomplished, for example, by turning the controller on or off, by turning the DC voltage converter on or off and/or connecting or separating the DC voltage converter output to/from the load.

If the energy transfer between two pulses is turned off, the voltage at the input for the controlled variable shall decrease because the energy storage devices of the circuit for adjusting the controller circuit will discharge. The result is that the controller shall detect an increasing deviation of the controlled variable from the target variable and thus shall actuate the DC voltage converter in such a way that the maximum load current will be generated. For transferring maximum power the duty cycle may be set to up to 100%, so that the pulse duration equals the pulse period duration.

A duty cycle of up to 100% can lead, depending on the embodiment, to a short-circuit detection and/or to excessive induction in the magnetic components of the DC voltage converter which upon saturation may produce a short circuit which will trigger the short circuit detection.

The invention has the objective of avoiding maximum power immediately after the end of a break, that is, upon start of a pulse. The duty cycle should rather be set to a value it has in steady state.

This problem shall be solved in such a way that the circuit configuration shall have at least one means for preventing the discharge of the at least one storage device for electrical energy of the adjustment circuit in the off-state of energy transfer.

The invention is based on the following consideration:

In known circuit configurations, the energy storage devices for adjusting the controller circuit will be discharged by the means of load current detection after turning off the energy transfer. Thus, the voltage between the input for the controlled variable and the reference potential will drop. The voltage hereby corresponds to the load current which has dropped to zero as well.

The present invention thus includes at least one means for preventing the discharge of the at least one storage device for electrical energy of the circuit for adjusting the controller circuit which shall prevent the discharge of the energy storage devices of the circuit for adjusting the control circuit when the energy transfer is turned off. After turning on, the energy storage devices will then be not or only partially discharged. The potential which will settle at the input for the controlled variable shall then correspond to the load current present in steady state and not to the actual load current which will be at zero or at low level after turning on the energy transfer. According to the potential at the input for the controlled variable, the first duty cycle will then be set, which means that the first pulse duration shall remain unchanged. The aforementioned consequences of an increased first duty cycle will thus not occur.

The means for preventing discharge of the at least one electrical energy storage device can have a controllable switching element with control terminal or itself be a controllable switching element with control terminal. The control terminal of the controllable switching element can be connected to the input for turning the energy transfer by the DC voltage converter on and off. As switching element, a transistor is advantageous.

The controllable switching element can establish and interrupt a connection between the input for the controlled variable and the means for load current detection. Upon interrupted connection, the energy storage devices of the circuit for adjusting the controller circuit will be prevented from discharging via the means of load current detection.

The control circuit may have a differential amplifier which output shall be connected to the controller. The differential amplifier may have a feedback path. The output of the differential amplifier can be connected via an output for feedback of the controller circuit as well as via the circuit for adjusting the controller circuit with the input for the controlled variable. The input of the differential amplifier can be connected to the input for the controlled variable. The other input of the differential amplifier shall be connected to a reference voltage source.

In the method presented in this invention for powering loads, especially light emitting diodes, by a circuit configuration, especially with a circuit configuration presented in this invention, electrical energy shall be transferred to the load by a DC voltage converter for powering the load. The average electrical power shall be adjusted by changing the second duty cycle. The special feature of the method presented in this invention is characterized in that when the energy transfer is turned off the means for preventing shall prevent discharge of the at least one storage device for electrical energy of a circuit for adjusting the control circuit.

A switching element of the means for discharge prevention can, upon application of an Off signal of an input (ON) for turning the energy transfer on and off, interrupt a connection between an input for the controlled variable and a means for load current detection and, upon application of an On signal to this input, establish this connection.

Further areas of applicability of the present invention will become apparent from the detailed description provided hereinafter. It should be understood that the detailed description and specific examples, while indicating the preferred embodiment of the invention, are intended for purposes of illustration only and are not intended to limit scope of the invention.

BRIEF DESCRIPTION OF THE DRAWINGS

The figures attached below shall further explain the invention. The following is shown.

DETAILED DESCRIPTION OF THE PREFERRED EMBODIMENT

Figure 1:
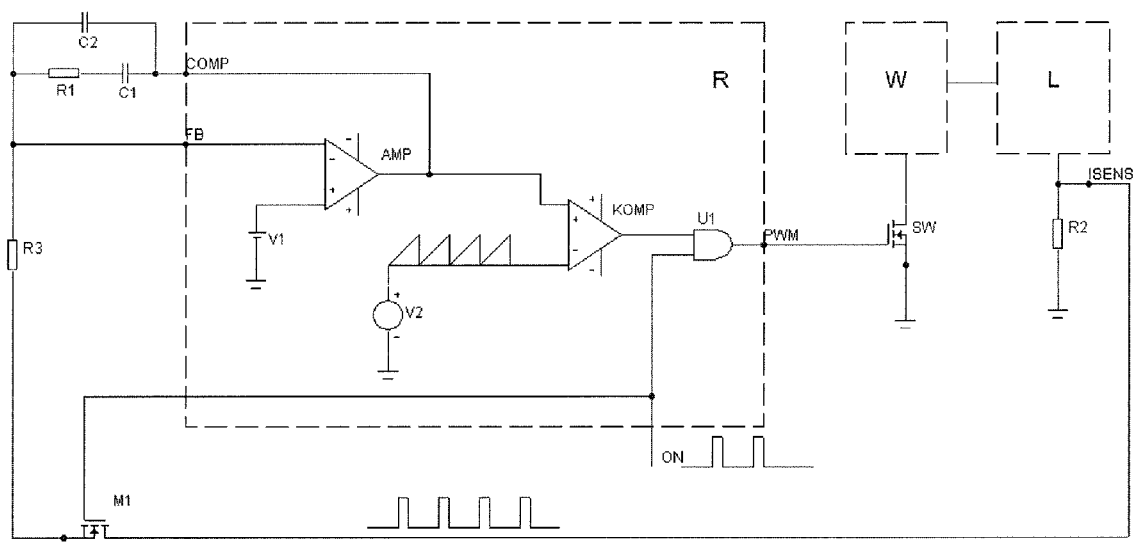
FIG. 1 A simplified diagram of the circuit configuration presented in this invention and FIG. 2 the curves of the load current and the signal for actuating the controllable switching element of the switching converter.

The circuit configuration presented in this invention shall have a controller circuit R. This controller circuit R shall be connected via an output PWM to a controllable switching element SW of a DC voltage converter W. In the figure, only the aforementioned controllable switching element SW of the DC voltage converter is shown. The remaining components of the DC voltage converter W are not shown. In principle any suitable DC voltage converter may be used as DC voltage converter. A load L shall be supplied with electrical energy via the DC voltage converter W.

The load current flowing through load L shall be converted via a resistor R2 as a means for load current detection into a voltage proportional to the load current. This voltage signal shall be fed via a controllable switching element M1 and a resistor R3 to an input FB for the controlled variable of the controller circuit.

Within the controller circuit R, the input FB shall be connected to an inverting input of an operational amplifier AMP. The non-inverting input of the differential amplifier shall be connected to a reference voltage source V1. The output of the operational amplifier AMP shall be fed back via an output COMP of the controller circuit and a circuit R1, C1, C2 for adjusting the controller circuit R to the input FB for the controlled variable. The operational amplifier AMP shall thus have a feedback path.

The circuit R1, C1, C2 for adjusting the controller circuit consists of a resistor R1 and a capacitor C1, wired in series, wired in parallel with a capacitor C2. The capacitors C1 and C2 of the circuit R1, C1, C2 for adjusting the controller circuit R are devices for storing electrical energy.

The output of operational amplifier AMP shall be fed to the non-inverting input of a comparator KOMP which represents the controller of the controller circuit R and generates the actuation signal. The inverting input of the comparator KOMP shall be connected to a voltage generator V2 providing a sawtooth voltage.

The output of the controller KOMP shall be fed to a first input of an AND gate U1. A second input of the AND gate U1 shall be connected to an input ON of the controller circuit R. At this input, a periodic pulse train shall be applied which can turn on the energy transfer by the switching converter. The combination of this signal for turning the energy transfer by converter W by means of the actuation signal at the output of controller R on and off causes the actuation signal only then be put through to the switching element SW via the PWM output of the controller circuit when an energy transfer is intended to take place.

The signal applied to the input ON for turning the energy transfer on and off shall also be wired via an output of the controller circuit to the actuation terminal of the controllable switch M1. This connection ensures that the input for the controlled variable FB shall only then be connected to the means R2 for load current detection when the energy transfer by converter W to the load is turned on. Thus, the connection between the energy storage devices C1 and C2 of the circuit R1, C1, C2 for adjusting the controller circuit R and the means R2 means for load current detection shall be interrupted when the energy transfer is turned off. With energy transfer turned off, it is not possible for the energy storage devices C1 and C2 to discharge via the means R2 for load current detection and the voltage at input FB for the controlled variable shall be maintained even with energy transfer switched off.

Figure 2:
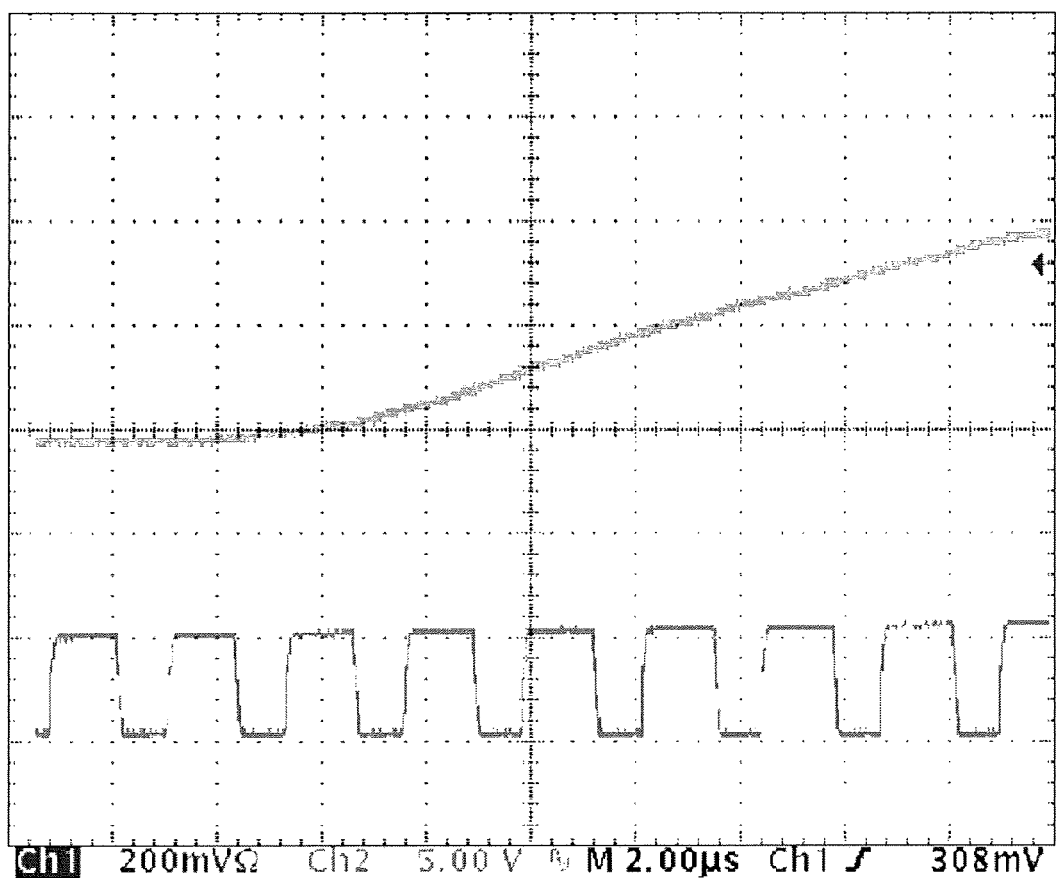

The effect of maintaining the voltage at the FB input for the controlled variable is illustrated in FIG. 2. Despite the missing load current for turning on energy transfer upon pulse start which will subsequently increase, the first duty cycle adjusting the load current level of the signal for actuating the switching element SW of the converter will not increase. Only in steady state a direct dependency of the voltage at the FB input of the controller circuit on the load current shall manifest itself.

As depicted, the invention relates to a circuit configuration for powering electrical loads, especially light emitting diodes, using a DC voltage converter (W) with controllable switching element (SW) actuated by a pulse-width modulated signal for adjusting the load current (ISENS), with a controller circuit (R) comprising of a controller (KOMP) for controlling the load current, with a circuit (R1, C1, C2) for setting the controller circuit (R) and with a means (R2) for load current detection, whereas the adjustment circuit (R1, C1, C2) shall at least have one device for storing electrical energy such as a capacitor (C1, C2), whereas the controller circuit (R) shall have an input (FB) for the controlled variable which shall be connected to the adjustment circuit (R1, C1, C2) and the means (R2) for load current detection, and whereas the circuit configuration shall have an input (ON) for turning energy transfer by the DC voltage converter (W) on and off, whereas the circuit configuration shall have at least one means (M1) for preventing discharge of the at least one electrical energy storage device (C1, C2) of the circuit (R1, C1, C2) which shall be set in the turned-off state of energy transfer.

LIST OF REFERENCE SYMBOLS

R Controller Circuit
W DC Voltage Converter
L Load
R1, C1, C2 Circuit for Adjusting the Controller Circuit
SW Switching Element of the DC Voltage Converter
R2 Means for Load Current Detection
ISENS Voltage Signal indicating the Load Current
M1 Means for preventing discharge of the at least one device for storing electrical energy of the adjustment circuit
R3 Resistor
FB Controller Circuit Input for Controlled Variable
ON Input for Signal for turning the Energy Transfer on and off
COMP Feedback Output
PWM Actuating Signal Output
AMP Operational Amplifier
KOMP Comparator
U1 AND Gate
V1 Reference Voltage Source
V2 Sawtooth Voltage Generator As various modifications could be made to the exemplary embodiments, as described above with reference to the corresponding illustrations, without departing from the scope of the invention, it is intended that all matter contained in the foregoing description and shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

The invention claimed is:

1. A circuit configuration for powering electrical loads, including light emitting diodes, using a DC voltage converter comprising:
   a controllable switching element actuated by a pulse-width modulated signal for adjusting the load current;
   a controller circuit comprising a controller for controlling the load current, with a circuit for setting the controller circuit and with a load current detector;
   an adjustment circuit having at least one device for storing electrical energy;
   the controller circuit having an input for a controlled variable which can be connected to the circuit for setting the load current detector;
   the circuit configuration having an input for turning energy transfer by the DC voltage converter on and off; and
   the circuit configuration having at least one discharge preventer of the at least one electrical energy storage device of the circuit, which can be set in the turned-off state of energy transfer.

2. The circuit configuration according to claim 1, characterized in that the discharge preventer of the at least one electrical energy storage device can have a controllable switching element with a control terminal.

3. The circuit configuration according to claim 2, characterized in that the control terminal of the controllable switching element can be connected to the input for turning the energy transfer by the DC voltage converter on and off.

4. The circuit configuration according to claim 1, characterized in that the switching element can be a transistor.

5. The circuit configuration according to claim 2, characterized in the controllable switching element can establish and interrupt a connection between the input for the controlled variable and the load current detector.

6. The circuit configuration according to claim 1, characterized in that the control circuit can have a differential amplifier containing an output which can be connected to the controller.

7. The circuit configuration according to claim 6 characterized in that the output of the differential amplifier can be connected via an output for feedback of the controller circuit as well as via the circuit for adjusting the controller circuit with the input for the controlled variable.

8. A method for powering loads, including light emitting diodes, by a circuit configuration, comprising:
   transferring power for powering the load using the electrical energy of a DC voltage converter, the average electrical power being adjustable by changing a duty cycle; and
   when the energy transfer is turned off a discharge preventer can prevent discharge of at least one storage device for electrical energy of a circuit for adjusting a control circuit.

9. The method according to claim 8, wherein the switching element of the discharge preventer can, upon application of an Off signal of an input for turning the energy transfer on and off, interrupt a connection between an input for the controlled variable and a load current detector and, upon application of an On signal to this input, establish this connection.

10. The circuit configuration of claim 1 wherein the discharge preventer is a controllable switching element with a control terminal.

11. The circuit configuration of claim 1 wherein the device for electrical storage is a capacitor.

* * * * *